United States Patent
de Putter

[11] 3,926,813
[45] Dec. 16, 1975

[54] DEVICE FOR MEMBRANE FILTRATION

[75] Inventor: Warner Jan de Putter, Hardenberg, Netherlands

[73] Assignee: Wavin B.V., Zwolle, Netherlands

[22] Filed: June 20, 1974

[21] Appl. No.: 481,251

[30] Foreign Application Priority Data
June 21, 1973 Netherlands .......................... 738670

[52] U.S. Cl. ................................. 210/321; 210/433
[51] Int. Cl.² ........................................ B01D 31/00
[58] Field of Search ..................... 210/433, 496, 321

[56] References Cited
UNITED STATES PATENTS

| | | | |
|---|---|---|---|
| 3,392,840 | 7/1968 | Clark et al. .................... | 210/496 X |
| 3,610,418 | 10/1971 | Calderwood .................... | 210/433 X |
| 3,707,234 | 12/1972 | Salemi ............................ | 210/433 X |
| 3,712,473 | 1/1973 | Ellenburg ....................... | 219/496 X |
| 3,737,043 | 6/1973 | Clark .............................. | 210/496 X |
| 3,795,317 | 3/1974 | VanZon ......................... | 210/433 X |
| 3,820,661 | 6/1974 | Pages ............................. | 210/433 X |

Primary Examiner—Frank A. Spear, Jr.
Attorney, Agent, or Firm—Wigman & Cohen

[57] ABSTRACT

A membrane filtration device comprising a number of superposed blocks of resin and filler material. Each block is provided with continuous holes with a liquid impermeable wall and a membrane, and a non-woven material between said membrane and the wall of a hole. A permeate recovering space is situated between two subsequent blocks, said space opening into the inner side of a hollow drawing bar connecting subsequent blocks.

7 Claims, 5 Drawing Figures

FIG: 3.

DEVICE FOR MEMBRANE FILTRATION

BACKGROUND OF THE INVENTION

The invention relates to a device for membrane filtration comprising at least one integral block of resin containing fillers and/or reinforcing materials or not, provided with a plurality of continuous holes, tubular membranes for membrane filtration being disposed in each of said holes, an inlet for liquid to be purified or to be concentrated, a concentrate outlet for a concentrated liquid and a permeate outlet for discharging purified liquid and sealing means for sealing the space on the inner side of a membrane from the outer side of the membrane.

Such a device, wherein tubular membranes are disposed in continuous holes of a block of a thermosetting resin with sand as a filler material, is known per se. The purified liquid which traverses the membranes flows away through the porous blocks.

This device presents the disadvantage that the pressures to which the membranes are subjected cannot be compensated for by the porous resin-sand mass so that cracks are formed in the membranes. Another disadvantage is the difficult removal of exhausted membranes as, due to the applied high pressures during membrane filtration, the membranes are pressed into the pores of the porous sand-resin and are difficult to remove from said pores later on. Particularly the last mentioned disadvantage is very important as this decreases the practical use of the device.

SUMMARY OF THE INVENTION

The invention now aims to remove this disadvantage and to provide a device for membrane filtration, without the above mentioned disadvantages and which allows the removal of membranes always without destruction of the integral blocks provided with holes and moreover the purified liquid is not removed through the pores of the integral blocks.

According to the invention this aim is attained in that the walls of the continuous holes are liquid impermeable and resistant to the pressure applied during membrane filtration, and the length of the holes is chosen such that the liquid passed through the membranes flows towards the end of a block through an intermediate space between the membrane and the inner wall of the hole provided with this membrane.

By means of this device a very compact installation can be constructed, allowing the purification or concentration of a high amount of liquids.

As the manufacture of very long blocks may involve great difficulties, it is preferred that several blocks be sealingly connected with each other, by means of a drawing bar.

According to a particular advantageous embodiment several blocks are connected with each other by at least one hollow drawing bar, the inner side of said bar being connected with a liquid recovering space between two subsequent blocks.

Such a device offers the advantage that a great number of blocks can be combined with each other, as the intermediate space between the outer side of the membrane and the inner wall of a continuous hole must only be sufficient in order to allow the liquid to flow to the end of a block.

The liquid recovering space can be formed by placing two blocks onto each other and accommodating a sealing ring between said two blocks, said sealing ring being chosen such that the two blocks are held at distance from each other.

It is also possible to form the liquid recovering space by connecting the blocks sealingly with each other by using a sealing ring, whereby the block surfaces facing each other are provided with circular extending grooves, which grooves form circular channels, said circular channels being joined to an outlet channel which is connected with the inner side of the drawing bar.

It has been found that the membrane is not damaged even if the two blocks are held at a small distance from each other by means of a sealing ring, which is probably due to the fact that the greater part of the membrane is supported by the inner wall of the continuous holes in each integral block.

The intermediate space between the inner wall of a continuous hole and a membrane comprises preferably a layer of porous material and/or grooves provided in the liquid impermeable wall of a hole. A very preferred porous material is a non-woven synthetic resin material.

Figure 1:
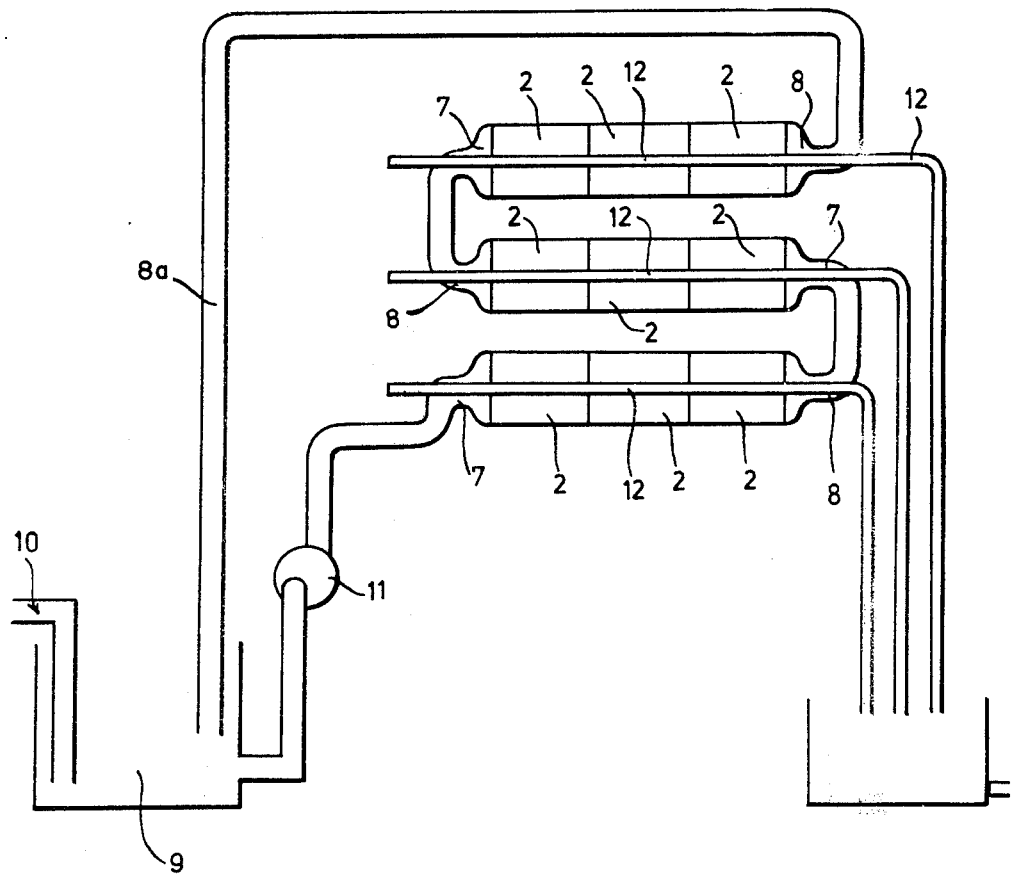
FIG. 1 represents schematically a device for membrane filtration according to the invention.
Figure 2:
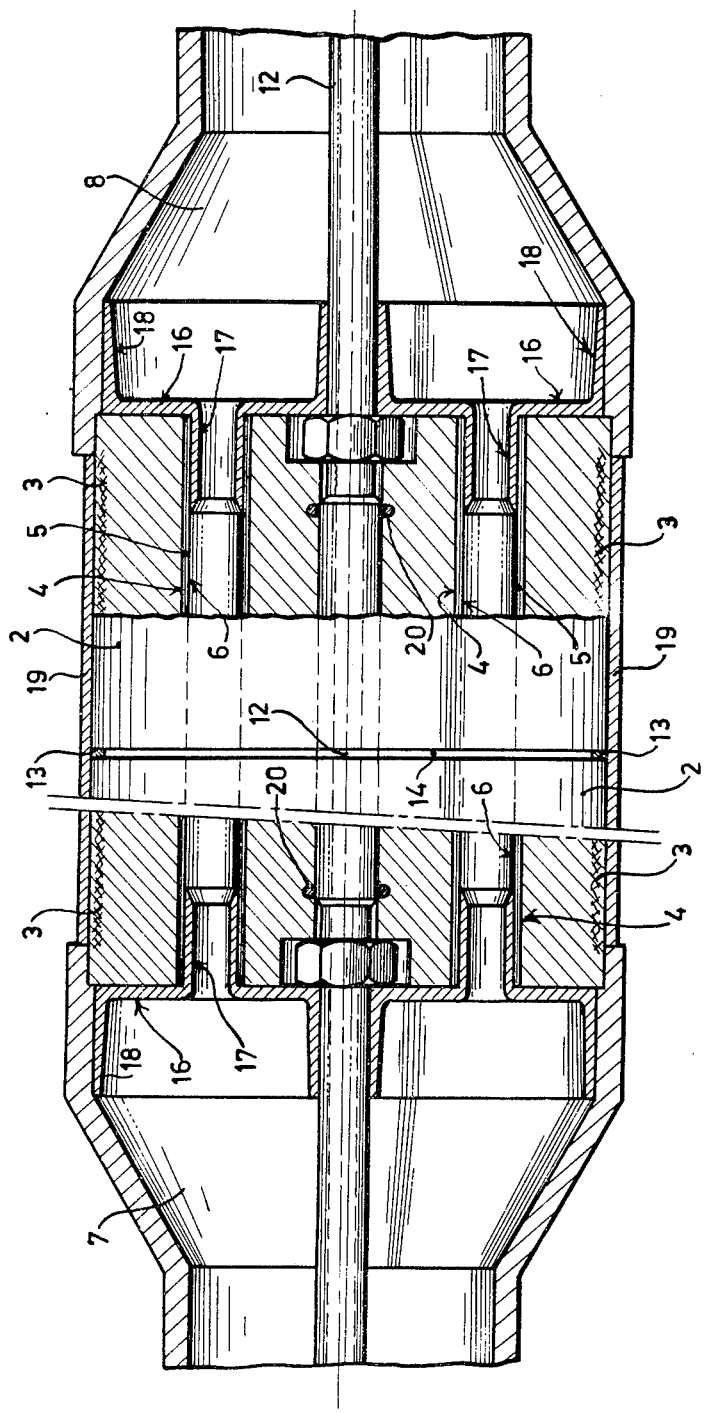
FIG. 2 an assembly of blocks.
Figure 3:
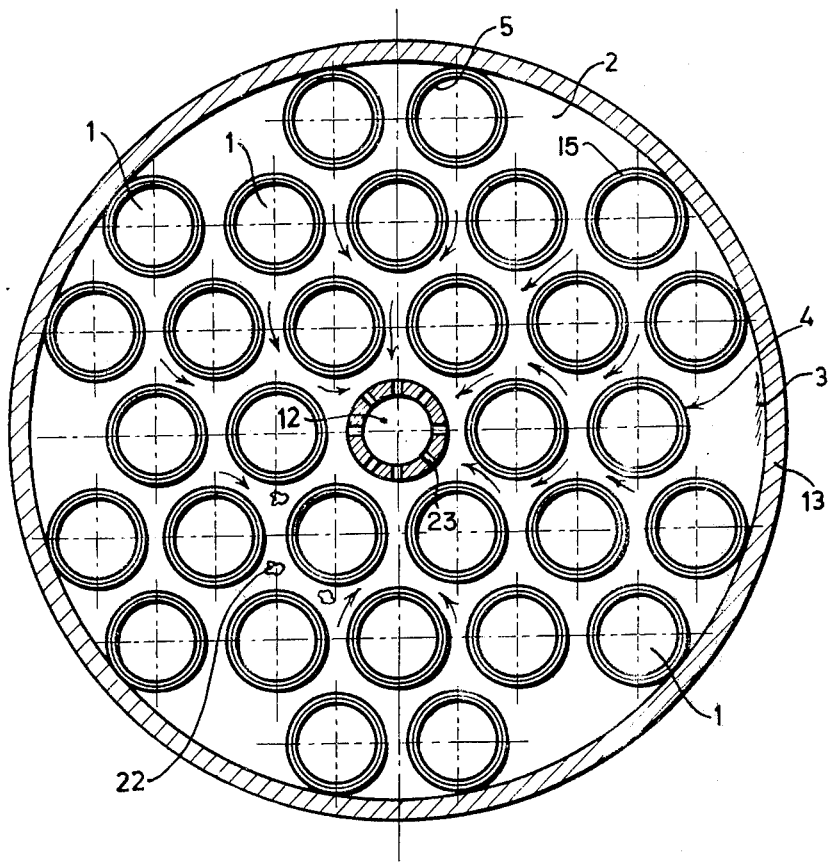
FIG. 3 a detail of a section of the junction of two blocks.
Figure 4:
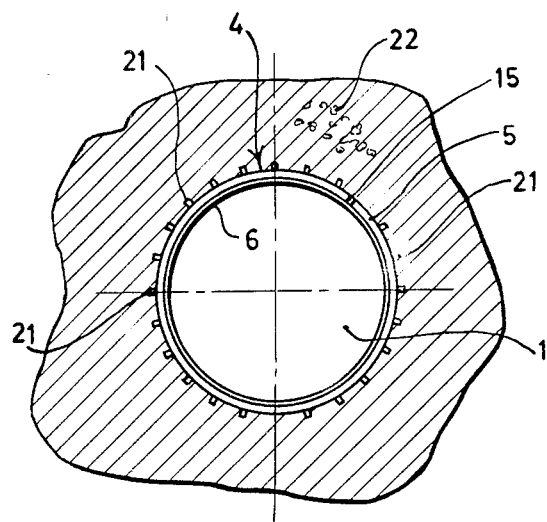
FIG. 4 a detail of a block, provided with a continuous hole in section.
Figure 5:
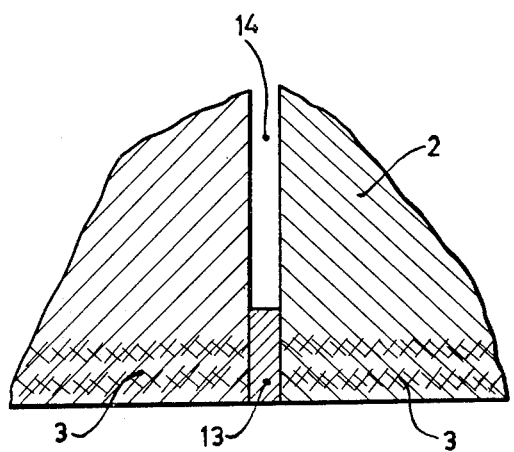
FIG. 5 a detail of a connection of two blocks.

DESCRIPTION OF PREFERRED EMBODIMENTS:

FIG. 1 shows schematically a device for membrane filtration comprising an integral block 2 provided, as best seen in FIG. 3, with a plurality of continuous holes 1. These blocks consist of a thermosetting resin with sand as filler particles, but it will be obvious that it is also possible to use only a thermosetting resin, such as a polyester resin. Polystyrene foam material is also suitable.

If desired, a reinforcing layer 3 can be provided along the circumference of a block 2, said reinforcing layer insuring that the block is resistant to pressures applied during membrane filtration.

The continuous holes 1 in a block 2 have impermeable wall surfaces, obtained by applying a thermosetting resin such as a polyester resin around the cores for forming the continuous holes, whereafter the complete space between the different cores is filled with thermosetting resin and filler material 22.

Of course, it is possible to use only thermosetting resin.

A particular advantage of the use of a thermosetting resin is that very well calibrated openings of the holes 1 can be obtained. The inner wall 4 supports a non-woven layer 5, on which a membrane 6 for reverse osmosis is applied. A tubular membrane 6 consists e.g. of a cellulose acetate, pretreated in a particular way in order to allow passage of the liquid through the membrane and to retain dissolved substances.

Furthermore the device is provided with an inlet 7 for introducing a liquid to be purified or to be concentrated. The liquid to be purified or to be concentrated may consist e.g. of impure water, or wastes obtained from industrial processes, e.g. processing liquids of potatoes obtained in the potato-starch production, and also liquids to be concentrated such as orange juice, cheese whey products, tomato juice and other fruit juices.

The device is also provided with a concentrate outlet 8 for discharging the more concentrated starting liquid after having passed the continuous holes 1, or the concentrate can be recycled to a storage tank 9 via a line 8a to which fresh liquid to be purified can be added through line 10. For obtaining the pressure as required for membrane filtration the device is provided with a pump 11. For discharging the purified liquid or permeate the device is provided with a permeate outlet 12, consisting of a hollow drawing bar which connects several blocks 2 with each other. For conveying the purified liquid or permeate which has moved through the membrane to the permeate outlet 12, two subsequent blocks may be held at distance from each other by means of a sealing ring 13, said sealing ring 13 forming with the subsequent blocks a liquid recovering space 14. This liquid recovering space is connected with the inner side of the hollow drawing bar through openings 23.

A great advantage of this embodiment is the discharge of the purified liquid through a central permeate outlet, facilitating an easier handling of the device.

Instead of choosing the sealing ring such that two subsequent blocks are held at distance from each other, thereby forming a liquid recovering space 14, the liquid recovering space 14 can also be formed by forming grooves in two surfaces of the two subsequent blocks facing each other, the grooves in the surfaces of the blocks forming together circular channels which join a central discharge channel opening into the drawing bar.

It is also necessary to use a central drawing bar in order to maintain the blocks in cooperation with each other, in case of high membrane filtration pressures.

The intermediate space 15 between the outer side of a membrane 6 and the inner wall 4 of a continuous hole is a as already disclosed hereinbefore, provided with a non-woven material 5. For a good discharge of permeate or purified liquid it is also possible to provide the inner wall 4 with grooves 21 in order to ensure a better liquid discharge. However, in order to prevent deformation of the membranes as much as possible, it is recommended to apply a non-woven mass 5 (e.g. of a non-woven polyester) between the outerside of membrane 6 and the inner wall 4 of a continuous hole 1.

The length of the blocks must be chosen such that the liquids passed through the membranes 6 can flow away through the intermediate space 15 between membrane 6 and the inner wall of hole 1 towards the end of a block 2.

The device is also provided with end seals 16 for sealing the space on the inner side of the membrane 6 from the space on the outer side of the membrane, i.e., the intermediate space 15. This end seals 16 may consist of e.g. of rubber flaps 18 with raised cylindrical parts 7 which are positioned in the continuous holes 1.

Reinforcing means 3 provided along the circumference of a block 2 may consist of glass fibres, steel wire or similar materials.

A block 2 may, can as already mentioned hereinbefore, be a solid block material, and may consist of a polyester resin or another thermosetting resin, and, if desired fillers, such as glass fibres, sand, resin, granulates, quartz or wood flour may be incorporated in the resin.

If desired the blocks of an assembly may be surrounded with a metal sleeve 19.

The drawing bar is sealingly accommodated in the blocks by means of sealing rings 20.

What I claim is:

1. Apparatus for membrane filtration comprising:
   a plurality of resin blocks arranged in spaced relation to each other, said blocks having a plurality of continuous holes disposed therethrough, the holes of each block being longitudinally aligned with the holes of the blocks adjacent thereto, the walls of said continuous holes being liquid impermeable;
   a tubular membrane disposed in each of said holes and supported by said blocks for filtering a liquid passing therethrough;
   sealing means associated with said blocks for enclosing the space between adjacent blocks and forming a purified liquid collecting zone therein; and
   tubular means extending through said blocks for removably interconnecting said blocks and for discharging purified liquid collected, said tubular means having a plurality of openings disposed through the wall thereof whereby the purified liquid collected is withdrawn.

2. The apparatus according to claim 1 wherein the outer wall of each of said tubular membranes is spaced from the wall of its associated aligned hole to form an intermediate space therebetween and including a porous material disposed in said intermediate space.

3. The apparatus according to claim 2 wherein the walls of said aligned holes are provided with longitudinal grooves.

4. The apparatus according to claim 2 including an inlet arranged at one end of said blocks for introducing a liquid to be purified into said tubular membranes, a concentrate outlet arranged at the other end of said blocks for discharging the concentrate from said tubular membranes and a purified liquid outlet connected to said tubular means.

5. The apparatus according to claim 2 including second sealing means disposed in said inlet and said concentrate outlet for sealing said intermediate spaces from the interior of said tubular membranes.

6. The apparatus according to claim 1 wherein the material of said blocks surrounding the liquid impermeable walls of said continuous holes is porous and is formed of a thermosetting resin material and a filler material, said blocks further including reinforcing means provided circumferentially thereof.

7. The apparatus according to claim 1 wherein said tubular means comprises a hollow drawing bar centrally disposed through said blocks.

* * * * *

UNITED STATES PATENT AND TRADEMARK OFFICE
CERTIFICATE OF CORRECTION

PATENT NO. : 3,926,813
DATED : December 16, 1975
INVENTOR(S) : Warner Jan de Putter It is certified that error appears in the above—identified patent and that said Letters Patent are hereby corrected as shown below:

In the heading of the document, change the priority number from "738670" to -- 7308670 --.

Column 3, line 43, after "is" delete "a";

Column 3, line 62, after "parts" change "7" to --17--;

Column 4, line 4, after "may" delete "can".

Signed and Sealed this

Fourteenth Day of September 1976

[SEAL]

Attest:

RUTH C. MASON
Attesting Officer

C. MARSHALL DANN
Commissioner of Patents and Trademarks